Patented Feb. 20, 1945

2,369,666

UNITED STATES PATENT OFFICE 2,369,666

SULPHUR DYESTUFFS AND PROCESS OF PREPARING THE SAME

Arthur Lawrence Fox, Woodstown, N. J., assignor to E. I. du Pont de Nemours & Company, Wilmington, Del., a corporation of Delaware No Drawing. Application November 21, 1942, Serial No. 466,481

15 Claims. (Cl. 260—128)

This invention relates to novel sulphur colors which are prepared by the action of an aluminum-chloride-sulphur-monochloride complex upon organic dyestuffs and intermediates for organic dyestuffs. More particularly, this invention deals with novel coloring matters having the properties of sulphur dyestuffs and being obtainable by reacting with an aluminum-chloride-sulphur-monochloride complex of the constitution $AlCl_3.2S_2Cl_2$ upon organic dyes and pigments of the anthraquinone, indigo, thioindigo, phthalocyanine, azo and sulphur classes, and upon aromatic compounds which are generally used as intermediates for coloring matters of the above classes.

It is an object of this invention to provide a new and economical method for the production of sulphur colors. It is a further object of this invention to provide sulphur colors not now known. It is a further object of this invention to convert organic coloring matters and intermediates into insoluble coloring compounds which may be applied to cotton fiber from a sodium sulphide vat. Other and further important objects of this invention will appear as the description proceeds.

In the past, sulphur colors have been prepared in general by reacting dye intermediates with sodium polysulphide over extremely long periods of time, e. g., 10 to 150 hours. Other methods employed have included high temperature fusions with sulphur or sulphides, but these methods have been destructive to the organic molecules involved.

By this invention there is provided a convenient, quick and economical method for preparing sulphur colors by treating aromatic compounds with a complex of sulphur chloride and aluminum chloride which is easily and cheaply prepared and which is extremely reactive. By this invention it is simply necessary to treat the organic molecule with this reagent for relatively short periods of time, depending on the activity of the molecule, and drown the reaction mass. It has been found in many cases that a reaction period of 5 minutes is ample, although longer reaction periods, even up to 25 hours, are sometimes preferable and are included within the scope of this invention.

It is worthy of note that treatment of organic compounds with sulphur monochloride in the presence of aluminum chloride as a catalyst has been done on various occasions in the art. However, these treatments did not result in the same products or mixtures of products as are obtainable according to this invention. The products from said older procedures were not dyestuffs, and their chlorine content was generally much larger than in the reaction products of this invention.

The distinctive feature of my present invention is that instead of using a mixture of sulphur monochloride and aluminum chloride, I employ a complex addition product of these two reagents carefully prepared in advance, as by heating the two reagents together in suitable proportions by weight. One of the commonest addition products thus obtained is a complex of constitution $AlCl_3.2S_2Cl_2$, whose specific gravity referred to water is 1.784 (Ruff and Golla, Zeit, f. anorg. u. algem. Chemie, vol 138, pages 17–32; Zentralblatt, 1924, II, 1570). However, up to certain limits an excess of sulphur monochloride may be employed with the above complex, with the result that the reaction product may contain a larger proportion of chlorine, but is otherwise of the same general nature as in the preferred embodiments of this invention. Large excesses of free sulfur monochloride, however, tend to reduce the quantity of vattable color obtained.

The characteristic of the novel compounds obtained according to this invention is that they are colored bodies of the sulphur dyestuff class. In other words, they may be reduced with aqueous sodium sulphide to produce a "sulphur dye vat," which has affinity for textile fiber, and which may be oxidized on the fiber into dyeings of good fastness qualities. Presumably, the novel compounds contain disulphide groups, —S—S—, which are reduced by the alkaline sulphide vat to mercapto groups: —SH. The new dyestuffs generally also possess combined chlorine, thereby distinguishing from known sulphurized dyestuffs obtained by subjecting dyestuffs and intermediates of the above classes to sulphurization treatments by the aforementioned methods of the prior art.

The crude reaction products of this invention are isolated by drowning the reaction mass in water or on ice and may be purified by extraction with dilute alkali. This dissolves the aluminum as sodium aluminate and converts any precipitate of sulphur to sodium sulphide or sodium sulphhydrate. It has been found that many of the sulphur colors made by this procedure are so easily vattable with sodium sulphide that the sodium sulphide produced in the action of the sodium hydroxide on the sulphur in the drowned crude product causes the colors to vat; consequently, in some cases, it is necessary to isolate the sulphur color by an oxidative procedure, such as blowing with air or treatment with an oxdizing agent. However, many of the other dyes formed are not vatted by the low concentration of sodium sulphide formed in the extraction and may be isolated directly by filtration. For the purpose of analysis, the crude materials purified by extraction with caustic may be further extracted with carbon disulphide to remove any free sulphur.

As already indicated, the dyes made according to this invention may be converted into soluble leuco derivatives by heating with sodium sulphide solutions. It has been found advisable in many cases to vat the dye by heating the dry material with sodium sulphide melted in its own water of crystallization. This concentrated solution easily vats the dye and on dilution completely soluble leuco vats are obtained. These may be employed to dye cotton and rayon. In other cases wool, silk, and nylon have been dyed, but due to the alkalinity of the vat, great care must be exercised not to destroy the fiber.

The following examples are given to illustrate this invention, without any intent however to limit my invention to the details of procedure. Parts mentioned are by weight.

Part A.—Preparation of the aluminum-chloride-sulphur-chloride complex.

1975 parts aluminum chloride ($AlCl_3$) and 4215 parts of sulphur monochloride ($S_2Cl_2$) were mixed and heated at 90–95° C. for 36 hours. The reaction mass on cooling was a dark brown liquid comprising the sulphur chloride-aluminum chloride complex.

Part B.—Preparation of novel sulphur colors.

Example 1

To 200 parts of the above sulphur-chloride-aluminum-chloride complex 50 parts of copper phthalocyanine were added at room temperature. This caused the temperature to rise to 45° C. The product was warmed to reflux and appeared to react vigorously but the reaction mass became too viscous to stir, so 200 parts more of the sulphur - chloride - aluminum - chloride complex were added. After 40 minutes of refluxing, the product was drowned on ice, filtered, washed, slurried with hot dilute sodium hydroxide, filtered and again slurried with hot dilute sodium hydroxide. A sample of the above was extracted with carbon bisulphide and gave the following analysis: S, 33.4%; Cl, 19.55%; Cu, 5%; N, 8.65%. This material vatted with sodium sulphide and dyed cotton a very bright green shade which showed exceptional light fastness for a sulphur color.

Example 2

200 parts of the above sulphur-chloride-aluminum-chloride complex were cooled in an ice bath, and 40 parts of copper phthalocyanine were added, all at one time. The mixture was stirred at room temperature for one hour, but sufficient thionation had not occurred to permit the product to vat with sodium sulphide to any appreciable degree. The reaction mixture was stirred at room temperature for 26 hours and still considerable unvattable material was present. It was then heated for 24 hours at 60° C., drowned on ice, extracted with sodium hydroxide, filtered, washed with acetone and dried. Analysis: S, 39.7%; Cl, 9.30%; N, 9.62%; Cu, 5.43%. This material dyed cotton a bluish green shade.

Example 3

90 parts of the sulphur-chloride-aluminum-chloride complex and 45 parts of anhydrous zinc chloride were mixed and heated to 100° C., then 30 parts of copper phthalocyanine were added. The reaction mass became too thick to stir but was heated for 18 hours at 100° C., and drowned in 10% aqueous sodium hydroxide, filtered, washed twice with dilute sodium hydroxide and once with hot dilute hydrochloric acid, filtered, dried and washed twice with carbon bisulphide. Analysis: S, 26.69%; Cl, 12.17%; N, 10.92%.

Example 4

90 parts of the above sulphur-chloride-aluminum-chloride complex and 53 parts of anhydrous ferric chloride were heated to 100° C., and then 30 parts of copper phthalocyanine were added. The reaction mass was heated to 120° C. for 5 hours. After one hour it had become too thick to stir. It was drowned in ice and hydrochloric acid, filtered, slurried twice with hot dilute caustic and once with hot hydrochloric acid, and then extracted twice with carbon bisulphide. Analysis: S, 22.67%; Cl, 13.88%; N, 11.93%; Cu, 6.6%. From a sodium sulphide vat the product dyes cotton a bright yellow green.

Example 5

A run was made similar to the previous Example 4 except that 45 parts of cupric chloride were substituted for the 53 parts of anhydrous ferric chloride. The product analyzed: S, 28.54%; Cl, 11.88%; Cu, 6.70%; N, 11.06%. This product gave a very yellow green dye on cotton.

Example 6

To 210 parts of the sulphur-chloride-aluminum-chloride complex were added, at 15° C., 48 parts of dehydro-thio-paratoluidine. The reaction mass became unstirrable and was allowed to stand at room temperature for 40 minutes and was finally heated to 80° C. At this temperature the reaction became rapid, causing the temperature to rise rapidly to 90° C., and the reaction mass became fluid enough to stir. It was agitated one hour at 90° C., drowned on ice and hydrochloric acid. The solid was filtered off, slurried three times with hot dilute sodium hydroxide and once with hot hydrochloric acid, washed acid-free, dried and extracted twice with carbon bisulphide. Analysis: S, 40.92%; Cl, 5.07%; N, 6.77%. This material vatted easily with sodium sulphide and dyed cotton a bright yellow shade which was fast to chlorine and which possessed excellent wash fastness.

Example 7

To 240 parts of the sulphur-chloride-aluminum-chloride complex there was added at 25° C. 48 parts of Primuline Base. (Color Index #812 before sulphonation.) The reaction mixture was stirred for 3 hours at room temperature and the temperature then was raised to 80° C. for 30 minutes. The reaction mass was drowned on ice and hydrochloric acid, filtered, slurried twice with hot dilute sodium hydroxide, and then washed with hot dilute hydrochloric acid and dried. During the sodium hydroxide slurry a portion of the material became vatted and was isolated by precipitation from the alkaline filtrate with sodium bisulphite. The main product, on vatting with sodium sulfide, dyed cotton a bright, chlorine-fast yellow, which was brighter than commercial shades of yellow sulphur colors now on the market.

Example 8

105 parts of indigo were suspended in 1500 parts of carbon tetrachloride, and to this were added 161 parts of the above mentioned sulphur-chloride-aluminum-chloride complex over a period of 15 minutes. This caused at 10° C. rise in temperature. The reaction mass was stirred at 80° C. for 2 hours and worked up as in the preceding examples. The product dyed cotton a green shade.

Example 9

30 parts of dithio-beta-iso-indigo were dissolved in 900 parts of carbon tetrachloride and to this solution were added 80 parts of the said sulphur-chloride-aluminum-chloride complex at 25° C. The reaction mass was then refluxed for one hour, drowned and worked up in the usual manner. Analysis: S, 27.49%; N, 8.5%; Cl, .69%. The product gave a brown dyeing when applied to cotton from a sodium sulphide vat.

Example 10

300 parts of sulphuryl chloride and 38 parts of 6,6'-diethoxy-thio-indigo were mixed, and to the mixture were added with stirring 20 parts of the sulphur-chloride-aluminum-chloride complex, and the reaction mass was then refluxed for 16 hours at 64° C. The precipitate was filtered, washed with acetone and carbon bisulphide. Considerable material was soluble in the acetone. The residue was a bright red powder which vatted easily with sodium sulphide and gave a bright red dyeing on cotton.

Example 11

39 parts of 4,4'-dimethyl-6,6'-dichloro-thio-indigo were suspended in 900 parts of carbon tetrachloride and treated with 82 parts of the sulphur-chloride-aluminum-chloride complex. The reaction mass was heated at 210° C. for 2 hours and became too thick to stir. It was then drowned on ice and dilute hydrochloric acid, steam distilled, filtered, slurried with hot dilute sodium hydroxide, filtered and dried and extracted with carbon bisulphide. Analysis: S, 24.57%; Cl, 18.13%. This material dyed cotton from a sodium sulphide vat a bright bluish red shade possessing fair chlorine fastness and good wash fastness.

Example 12

200 parts of liquid sulphur dioxide were mixed with 20 parts of the sulphur-chloride-aluminum-chloride complex and stirred until complete solution occurred. To this solution were added 20 parts of 2,1,2',1'-naphthioindigo. The reaction mass was allowed to warm up to room temperature overnight, evaporating off the sulphur dioxide. The residue was extracted with carbon bisulphide and boiled with dilute hydrochloric acid, filtered, washed with acetone and dried. The product dyed cotton from a sodium sulphide vat a reddish brown shade.

Example 13

100 parts of N-phenyl-indophenol were reacted with 600 parts of the sulphur-chloride-aluminum-chloride complex. The product was worked up as in the previous examples and gave a blue black dyeing of good wash and light fastness.

Example 14

100 parts of carbazole-indophenol were reacted with 300 parts of the sulphur-chloride-aluminum-chloride complex, giving a product which yielded an olive green dyeing from the sodium sulphide vat, possessing excellent wash fastness and good light fastness.

Example 15

100 parts of 3,8-diamino-4,7-dimethyl-acridine were reacted with 600 parts of sulphur-chloride-aluminum-chloride complex under the same conditions as above, and gave a reddish yellow sulphur color which dyed cotton from a sodium sulphide vat.

Example 16

100 parts of 2-methyl-3-amino-6-hydroxy-phenazine were reacted with 600 parts of the sulphur-chloride-aluminum-chloride complex at 100° C. for one hour. The dyestuff obtained was a very reddish shade of brown possessing fairly good light fastness.

Example 17

100 parts of the tetrakisazo dye expressed by the scheme:

amino-G-salt→aniline→m-toluidine,
(phosgenated)

were reacted with 200 parts of the sulphur-chloride-aluminum-chloride complex at 30° C. until there was no evidence of further reaction. The reaction mixture was then drowned on ice. The solid was filtered off and washed with carbon bisulphide. It contained 4 additional atoms of sulphur per molecule over those initially present. This dyed cotton from a sodium sulphide vat a brownish orange shade.

The term amino-G-salt in the above example stands for 2-naphthylamine-6,8-disulphonic acid, disodium salt.

Example 18

100 parts of the trisazo dye expressed by the schematic formula:

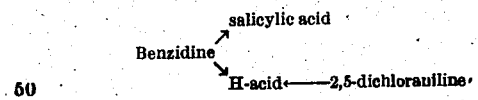

were reacted with 200 parts of the sulphur-chloride-aluminum-chloride complex under conditions similar to Example 17. The product contained 4 additional atoms of sulphur over those contained in the original molecule and dyed cotton a full green shade similar to the shade of the original dyestuff.

Example 19

100 parts of Pontamine Black E (Color Index No. 581) were reacted with 200 parts of sulphur-chloride-aluminum-chloride complex under conditions similar to Example 17. This introduced 4 sulphur atoms per molecule, and the product dyed cotton a black shade from a sodium sulphide bath.

Example 20

100 parts of the disazo dye expressed by the scheme:

amino-azo-benzene sodium sulphonate→
benzoyl-p-amino-benzoyl J-acid were reacted with 200 parts of sulphur-chloride-aluminum-chloride complex. The dyestuff produced dyed cotton from a sodium sulphide bath a slightly bluer red than did the original dyestuff.

Example 21

100 parts of the disazo dye expressed by the scheme:

(1-amino-8-naphthol-3,6-disulphonic acid→ cresidine), phosgenated were reacted with 200 parts of the sulphur-chloride-aluminum-chloride complex under conditions similar to those of Example 17. The dyestuff dyed cotton from a sodium sulphide bath a slightly bluer and duller shade than did the original azo dyestuff.

Example 22

100 parts of Lithosol Claret B (Color Index No. 88) were reacted with 200 parts of sulphur-chloride-aluminum-chloride complex under conditions similar to Example 17. The product gave a bluer shade of red, when dyed from a sodium sulphide bath on wool, than did the original dyestuff.

Example 23

100 parts of Pontachrome Fast Red E (Color Index No. 652) were reacted with 200 parts of sulphur - chloride - aluminum - chloride complex under conditions similar to those of Example 17. This introduced 8 sulphur atoms per molecule, and wool dyed with the product from a sodium sulphide bath was slightly duller in shade than wool colored with the original dye.

Example 24

100 parts of the azo dyestuff obtained by coupling diazotized ortho-naphthionic acid with beta-oxy-naphthoic acid were reacted with 400 parts of the sulphur-chloride-aluminum-chloride complex and gave a dyestuff much redder when dyed on wool than the original dyestuff.

Example 25

100 parts of the dyestuff obtained by coupling diazotized meta-chloro-aniline with the ortho-toluidide of beta-hydroxy-naphthoic acid were condensed with 400 parts of sulphur-chloride-aluminum-chloride complex and gave a full red shade. This material had to be dyed from a cold sodium sulphide bath in order not to destroy the azo linkages.

Example 26

100 parts of the dyestuff obtained by tetrazotizing 3,3'- diamino - azoxy - benzene and coupling with two moles of beta-hydroxy-naphthoic-acid-anilide were condensed with 400 parts of the sulphur - chloride - aluminum - chloride complex and gave a dull light brown dyestuff.

Example 27

Indanthrone was condensed with the sulphur-chloride-aluminum-chloride complex according to the above examples, and gave a product which dyed cotton from a sodium sulphide bath a light blue shade.

Example 28

Five parts of Ponsol Red Violet 2RNX (Color Index No. 1161) were reacted with 20 parts of sulphur - chloride - aluminum - chloride complex for 16 hours at 25° C., and the product obtained gave a bright pink color on cotton, when dyed from a sodium sulphide vat. The color of the vat was violet.

Example 29

Anthraquinone - 1,2,5,6-C,C'-diphenyl - thiazole was reacted with an excess of the sulphur-chloride-aluminum-chloride complex for 5 minutes. The product gave a bright yellow dyeing on cotton from a sodium sulphide bath.

Example 30

Dibenzanthrone was reacted with sulphur-chloride-aluminum-chloride complex for 3 minutes at 120° C., and gave a product which dyed cotton and rayon a deep violet shade from a sodium sulphide bath. It dyed nylon a much weaker shade.

Example 31

Iso-dibenzanthrone was reacted with an excess of the sulphur-chloride-aluminum-chloride complex for 3 minutes at 120° C. The product dyed cotton from a sodium sulphide vat.

Example 32

10 parts of dibenzenpyrene-quinone were reacted with 60 parts of sulphur-chloride-aluminum-chloride complex for 15 minutes at 80° C. This introduced 3.2 sulphur atoms and 1.6 chlorine atoms per molecule. The product dyed cotton a rich orange brown shade possessing very good wash fastness, light fastness and chlorine fastness.

Example 33

17 parts of 1,8-ditoluidino-anthraquinone were reacted with 81 parts of the sulphur-chloride-aluminum-chloride complex for one hour at 110° C. The product contained 7.4 sulphur atoms and 2.8 chlorine atoms per molecule and dyed cotton a green shade. The product possessed excellent light fastness and fair wash fastness.

Example 34

Quinizarin was reacted for 2 minutes with an excess of the sulphur-chloride-aluminum-chloride complex. The product dyed cotton from a sodium sulphide bath a full rich magenta shade. When the thionation was continued for 20 minutes, the product dyed cotton a rich green shade from a sodium sulphide bath.

Example 35

Safranine was reacted with an excess of the sulphur-chloride-aluminum-chloride complex at room temperature for 12 hours. The product dyed cotton a bright pink.

Example 36

Metal-free phthalocyanine reacts with the sulphur-chloride-aluminum-chloride complex under the conditions above indicated to give a blue shade sulphur color.

Example 37

Rhodamine reacts with the sulphur-chloride-aluminum-chloride complex, in similar manner, to give a dyestuff dyeing cotton from a sodium sulphide bath in brilliant pink shades.

In a similar manner, numerous other dyestuffs and intermediates for dyestuffs may be sulphurized by my novel process to give coloring bodies which dye textile material by the standard sulphur vat procedure. In other words, the colored bodies obtained are soluble in aqueous solutions of alkaline sulphide from which textile fiber may be dyed, said dyeings being then oxidized on the fiber as by aeration or by treatment with sodium perborate or with a mixture of acetic acid and sodium bichromate. As initial dyestuff to be sulphurized, coloring bodies of any of the well known classes, such as vat, azo, sulphur, phthalocyanine, etc. series, may be selected, and it makes no difference whether the body is a dyestuff in the strict sense (i. e., applicable to fiber in the form of a solution) or a pigment (applicable to the fiber in solid form, as by printing or padding). Since the effect of my treatment is to introduce into the body disulphide groups, the coloring body becomes soluble in the alkaline sulphide vat, and may be applied by the sulphur dye process, in any event.

In like manner, where my invention is applied to compounds which are not per se dyestuffs but only intermediates for dyestuffs, it is necessary and sufficient that the initial compound employed be one capable of yielding dyestuffs by condensation or association with chromophoric groups. In other words, any of the intermediates employable for the production of azor dyes, anthraquinone vat and mordant dyes, indigoid dyes, thioindigoid dyes, sulphur colors, phthalocyanines, etc. may be treated according to my invention to give sulphur colors. From the structural viewpoint, this class embraces all aromatic and aromatic-heterocyclic compounds, whether in the unsubstituted or hydrocarbon state such as benzene, toluene, naphthalene, anthracene, acenaphthene, benzpyrene-quinone; carbazole, quinoline, acridine, phenazine, etc.; or whether substituted by various chromophoric and auxochromic substituents, such as nitro, nitroso, amino, chloro, sulpho, carboxy, hydroxy or cyano.

In all the above examples, the sulphur-chloride-aluminum-chloride complex employed was the one prepared in Part A of this specification, wherein one mole of aluminum chloride was condensed with a slight excess over two moles of sulphur monochloride at elevated temperature and in the absence of a solvent. (Its constitution is presumed to be $AlCl_3.2S_2Cl_2$.) However, such precise conditions need not be adhered to, and larger excesses or even deficiencies of sulphur-monochloride may be employed in preparing the complex, since obviously the resulting reaction mass will contain the complex addition compound at least to some extent, with an excess of either free sulphur monochloride or aluminum chloride. The principal condition to be observed in forming the complex is to react the two ingredients at elevated temperature, say between 50 and 135° C., and in the absence of a solvent, to insure reaction between the aluminum chloride and sulphur-monochloride with formation of the compound $AlCl_3.2S_2Cl_2$ to the extent that the laws of equilibrium will permit under the circumstances.

Also, in lieu of an excess of sulphur-monochloride in the treatment of the organic compound (dyestuff or intermediate), other diluents may be employed which are not attacked by the complex. As such intermediates may be used completely halogenated aliphatic compounds, for instance carbon tetrachloride or hexachloro-ethane, or sulphur-containing bodies such as sulphur dioxide, sulphuryl chloride and sulphur dichloride. Selenium monochloride may also be used as diluent; however, in this case selenium is often introduced into the final dyestuff.

An excess of aluminum chloride, or equivalent condensing agents such as zinc chloride, ferric chloride or cupric chloride, may also be employed, as shown by Examples 3, 4 and 5 above. As a rule, such condensing agents increase the sulphur analysis of the final product but do not otherwise disturb the essential nature of the novel reaction.

It will also be clear from the examples that the exact analysis of the product, especially as to S and Cl content, may be varied considerably by varying the conditions of the reaction, such as temperature, duration, and presence or absence of diluents and condensing agents. The latter two factors have already been discussed. But as for temperature and duration, these generally counterbalance each other. In other words, the higher the temperature the quicker the reaction is completed, and vice versa. As indicated by some of the examples above, reaction periods as long as 24 hours are not excluded from the scope of this invention, but in the average case I prefer to employ higher temperatures, say between 80 and 130° C., thereby shortening the reaction period to a few minutes, or at most a few hours. In general, I recommend carrying out the reaction with the aluminum-chloride-sulphur-monochloride complex at the highest temperature found practicable without causing excessive dissociation of the dyestuff being treated or of the complex itself.

Many other permissible variations in details of procedure without departing from the spirit of this invention will be apparent to those skilled in the art.

Additional illustrations of the aromatic intermediates which may be used as initial materials for my present invention may be found in my copending application of even date, Serial No. 466,482, which is devoted particularly to polycyclic aromatic hydrocarbons and their carboxylic acids, and Serial No. 466,483, which deals primarily with aromatic amines and aromatic-heterocyclic nitrogenous bases.

I claim as my invention:

1. In the process of sulphurizing an organic compound by treating such compound with an agent adapted to introduce vattable sulphur atoms into the organic compound, the improvement which consists of using as sulphurizing agent a complex addition compound of aluminum chloride and sulphur monochloride obtained by reacting aluminum chloride with sulphur monochloride at elevated temperature in the absence of a solvent.

2. In the process of sulphurizing an organic compound by treating such compound with an agent adapted to introduce vattable sulphur atoms into the organic compound, the improvement which consists of using as sulphurizing agent a complex addition compound of aluminum chloride and sulphur monochloride corresponding in constitution to the formula $AlCl_3.2S_2Cl_2$.

3. The process of producing an organic coloring matter which comprises reacting with a sulphur-chloride-aluminum-chloride complex of constitution $AlCl_3.2S_2Cl_2$ upon a compound selected from the group consisting of organic dyestuffs and intermediates for organic dyestuffs.

4. The process of converting a water-insoluble organic pigment into a dyestuff soluble in aqueous sodium sulphide solution, which comprises reacting such pigment with an aluminum-chloride-sulphur-monochloride complex of constitution $AlCl_3.2S_2Cl_2$.

5. The process of converting a dyestuff which is not vattable by the aid of sodium sulphide into a sulphur type dyestuff vattable by the aid of sodium sulphide, which comprises reacting upon such dyestuff with an aluminum-chloride-sulphur-monochloride addition compound as obtained by heating, at a temperature between 50 and 135° C., one mole of aluminum chloride with substantially two moles of sulphur monochloride.

6. The process of producing a sulphur type dyestuff which comprises reacting an aromatic compound with an aluminum-chloride-sulphur-monochloride addition compound as obtained by heating, at a temperature between 50 and 135° C., one mole of aluminum chloride with substantially two moles of sulphur monochloride.

7. The process of converting a thioindigoid coloring matter into a dyestuff applicable by the sulphur vat process, which comprises reacting said thioindigoid coloring matter with a sulphur-chloride-aluminum-chloride complex consisting at least in part of the addition compound represented by the formula $AlCl_3.2S_2Cl_2$.

8. The process of converting a phthalocyanine coloring matter into a dyestuff applicable by the sulphur vat process, which comprises reacting said phthalocyanine coloring matter with a sulphur-chloride-aluminum-chloride complex consisting at least in part of the addition compound represented by the formula $AlCl_3.2S_2Cl_2$.

9. Sulphur dyestuffs of the group obtainable by reacting an organic compound with a complex addition compound of aluminum chloride and sulphur monochloride of constitution $AlCl_3.2S_2Cl_2$, said dyestuff being characterized by possessing combined sulphur and chlorine and by being soluble in aqueous sodium sulphide to produce a vat from which cotton may be dyed by the sulphur vat process.

10. The novel sulphur and chlorine containing dyestuffs obtainable by reacting upon an organic coloring matter with an aluminum-chloride-sulphur-monochloride complex addition compound of constitution $AlCl_3.2S_2Cl_2$.

11. The novel sulphur and chlorine containing dyestuffs obtainable by reacting upon a thioindigoid vat coloring matter with an aluminum-chloride-sulphur-monochloride complex addition compound of constitution $AlCl_3.2S_2Cl_2$.

12. The novel sulphur and chlorine containing dyestuffs obtainable by reacting upon a phthalocyanine coloring matter with an aluminum-chloride-sulphur-monochloride complex addition compound of constitution $AlCl_3.2S_2Cl_2$.

13. The novel sulphur dyestuffs obtainable by reacting upon an aromatic compound with an aluminum-chloride-sulphur-monochloride complex addition compound of constitution $$AlCl_3.2S_2Cl_2$$

14. The process of producing a sulphur type dyestuff, which comprises heating copper-phthalocyanine with a sulphur-chloride-aluminum-chloride complex addition compound consisting at least in part of an addition compound of constitution $AlCl_3.2S_2Cl_2$, treating the reaction product with an alkali-metal hydroxide to remove excess sulphur and aluminum, and recovering the vattable sulphur color.

15. A sulphur derivative of copper phthalocyanine, obtainable by a process as defined in claim 14, said derivative being characterized by containing both chlorine and sulphur, and by being reducible in aqueous sodium sulphide to a vat from which cotton is dyed in bluish green to yellowish green shades.

ARTHUR LAWRENCE FOX.